Aug. 4, 1931.    K. DAVIS    1,817,297
PROCESS AND MECHANISM FOR SEPARATING INTERMIXED DIVIDED MATERIALS
Filed Dec. 3, 1925    5 Sheets-Sheet 1
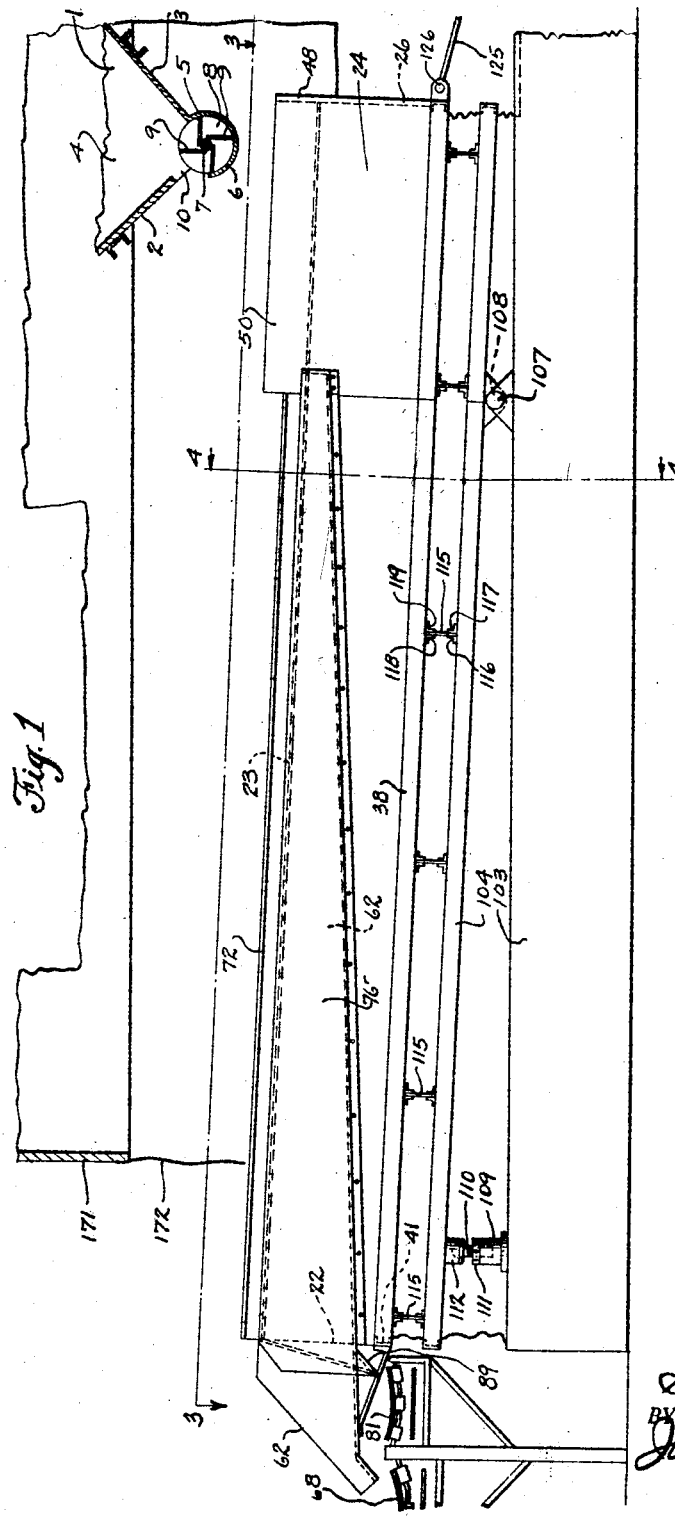
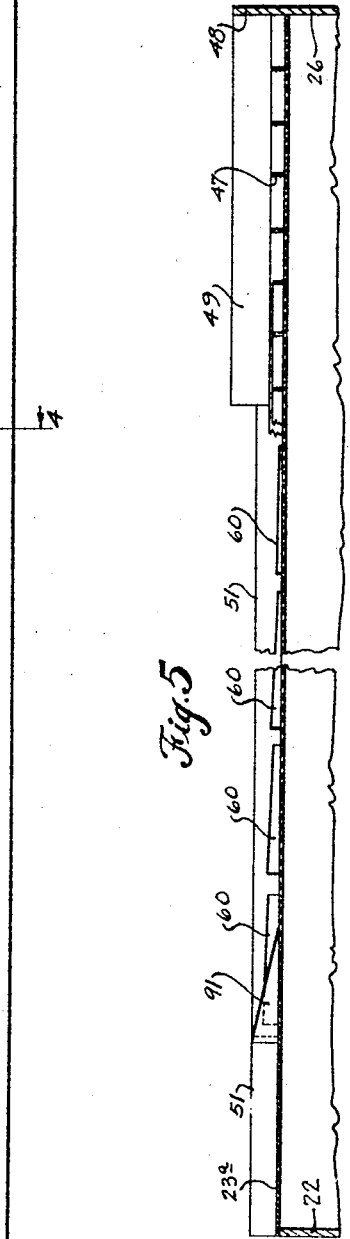
INVENTOR.
K. Davis
BY John D. Morgan
ATTORNEYS.

Aug. 4, 1931.  K. DAVIS  1,817,297
PROCESS AND MECHANISM FOR SEPARATING INTERMIXED DIVIDED MATERIALS
Filed Dec. 3, 1925  5 Sheets-Sheet 2

INVENTOR
K. Davis
BY John D. Morgan
ATTORNEY

Aug. 4, 1931.   K. DAVIS   1,817,297
PROCESS AND MECHANISM FOR SEPARATING INTERMIXED DIVIDED MATERIALS
Filed Dec. 3, 1925   5 Sheets-Sheet 3

INVENTOR
K. Davis
BY John D. Morgan
ATTORNEY

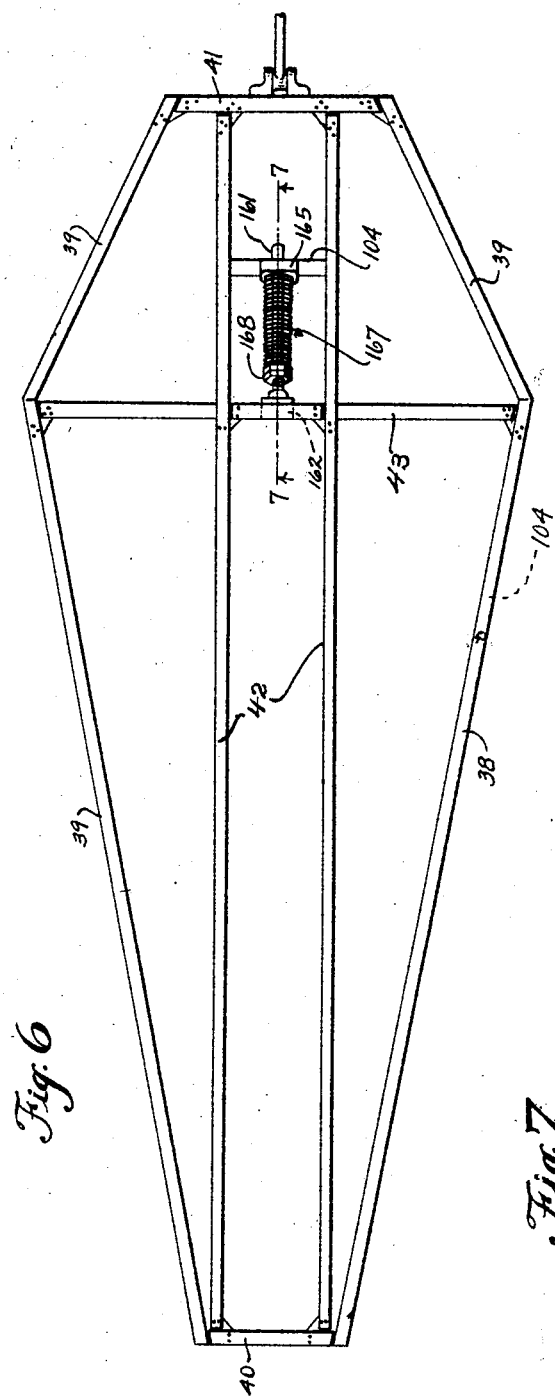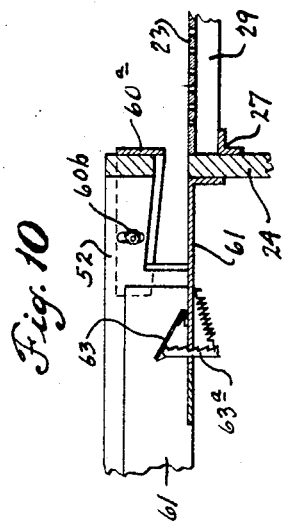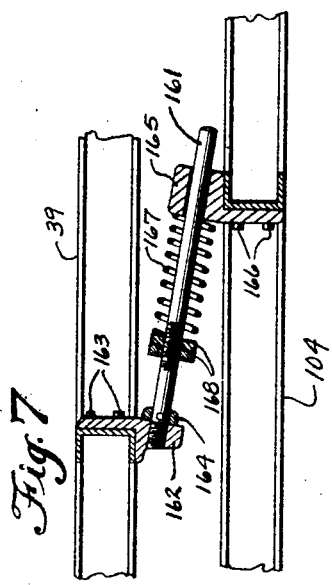

Aug. 4, 1931.  K. DAVIS  1,817,297
PROCESS AND MECHANISM FOR SEPARATING INTERMIXED DIVIDED MATERIALS
Filed Dec. 3, 1925  5 Sheets-Sheet 5
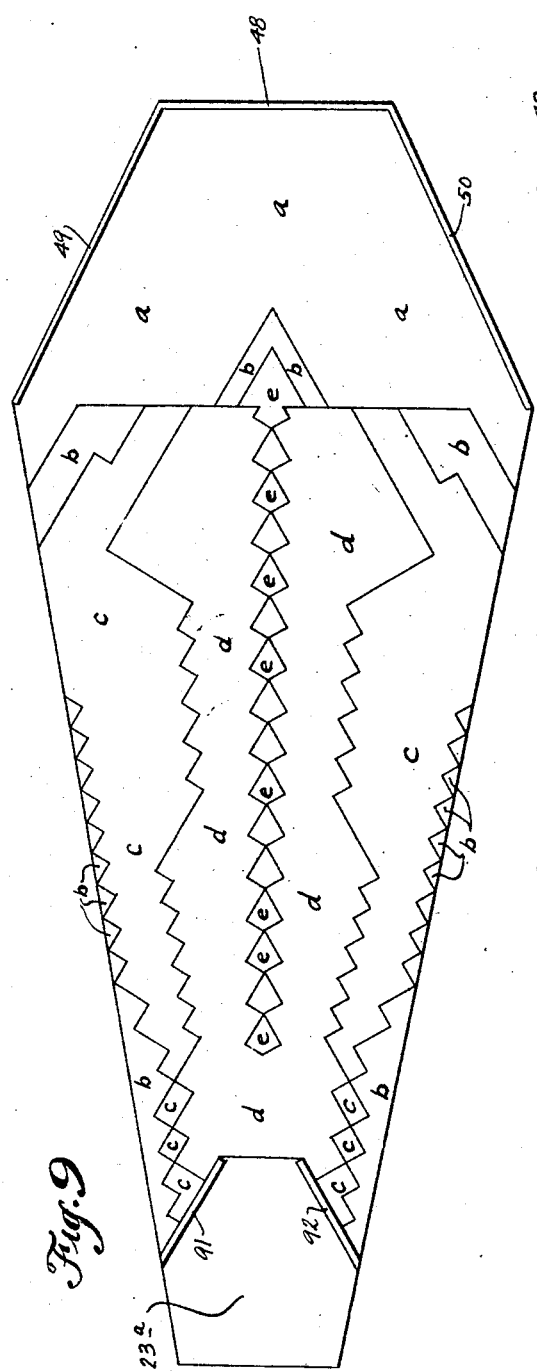
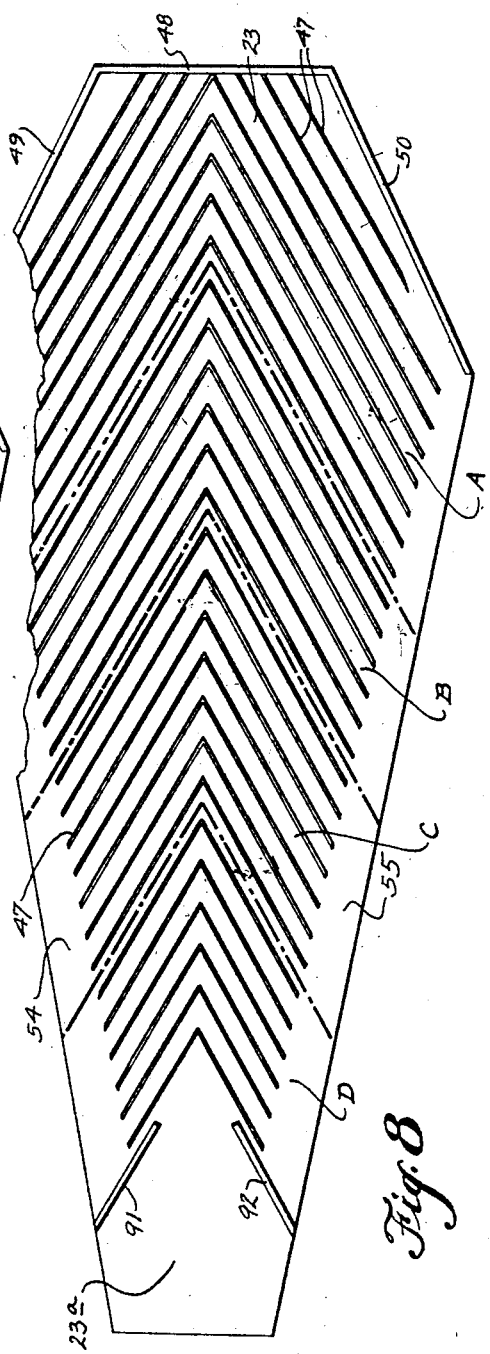
INVENTOR
K. Davis
BY John D. Morgan
ATTORNEY Patented Aug. 4, 1931

1,817,297

UNITED STATES PATENT OFFICE

KENNETH DAVIS, OF EBENSBURG, PENNSYLVANIA, ASSIGNOR, BY MESNE ASSIGNMENTS, TO PEALE-DAVIS COMPANY, OF WILMINGTON, DELAWARE, A CORPORATION OF DELAWARE

PROCESS AND MECHANISM FOR SEPARATING INTERMIXED DIVIDED MATERIALS

Application filed December 3, 1925. Serial No. 72,894.

The invention is directed to a novel and useful process and mechanism for separating intermixed divided materials of different specific gravities; and more particularly to a process and mechanism for separating such materials which vary relatively greatly in the size of the intermixed fragments or particles, while on the other hand, varying relatively little in their specific gravities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a side elevation of a mechanism embodying the invention, with the right-hand end thereof broken away;

Fig. 5 is a vertical, longitudinal section taken on the line 5—5 of Fig. 3;

Fig. 6 is a top plan of the supporting frame of the table shown in Fig. 1 with the pervious deck and superstructure removed;

Fig. 7 is a fragmentary, vertical section on the line 7—7 of Fig. 6;

Fig. 8 is a fragmentary plan, partially diagrammatic, showing the relation of the air zoning and the separating partitions on the table;

Fig. 9 is a diagrammatic plan showing the present preferred form of air zoning;

Fig. 10 is an enlarged fragmentary section on line 10—10 of Fig. 3.

Figure 4:
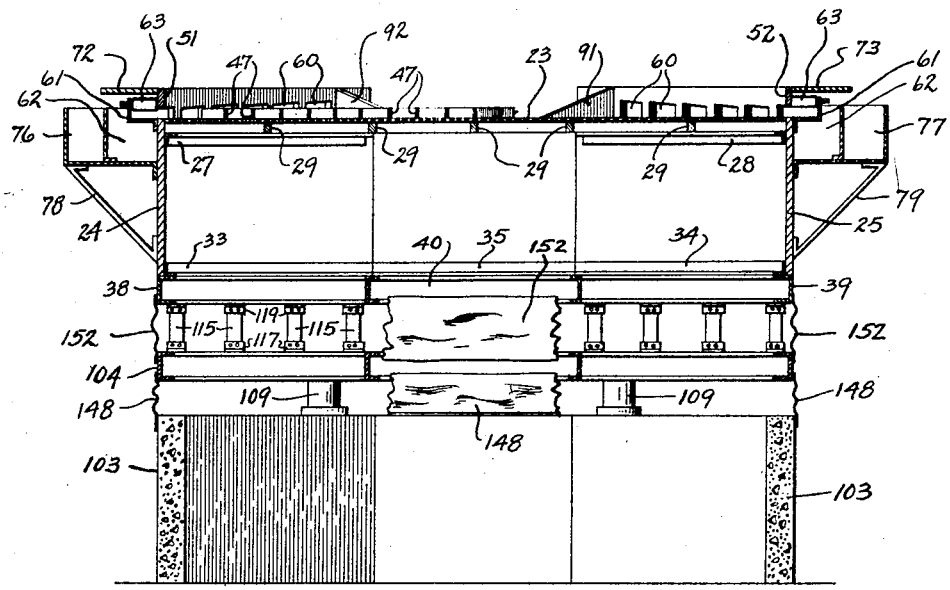
Fig. 4 is a transverse, horizontal section taken on the line 4—4 of Fig. 1.
Figure 2:
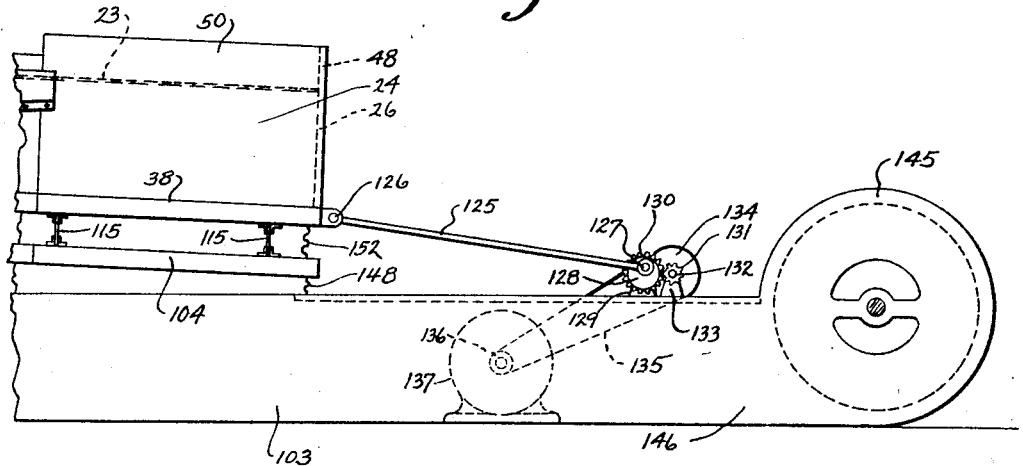
Fig. 2 is a side elevation of the right-hand end of the mechanism shown in Fig. 1 and adjoins thereon, the two figures constituting a complete side elevation.

The invention comprises a process and mechanism or separating intermixed divided materials, and delivering the different separated materials apart from each other and free from intermixture. The invention is directed more particularly to providing an improved process and mechanism whereby intermixed materials are successfully separated, wherein the fragments or particles of the various materials vary very greatly in size, and wherein the various intermixed materials differ relatively but little in their specific gravities; the rapid and successful commercial separation thereof thus presenting a very difficult problem.

The expression "intermixed divided materials" is used for convenience herein in designating a mixture comprising two or more materials in granular, fragmentary, pulverulent, or other like state, whether natural or due to previous handling or operations. The expressions "heavier" and "lighter" as applied to the materials, pertain to relative specific gravities, and are so used for convenience.

An example of materials, in the mechanical conditions and having the physical properties already described, is a mixture of coal, "bony", and rock and other impurities, as it comes from the mine, and the present invention in actual practice has been chiefly directed to the automatic cleaning of the coal as it comes out of the mine, and without previous preparation or handling.

One of the principal and most valuable features of my process and mechanism is, the ability to practically completely separate coal, "bony" and rock without the preliminary "sizing" which has heretofore been necessary, and which constitutes a tremendous and practically prohibitive item of labor and expense. By my invention, I am enabled to practically complete the separation of the coal, "bony" and rock, as it comes from the mine, from the finest dust up to pieces three inches in dimensions, by a single operation and by running it in very large volume over merely a single cleaning table, the coal going direct to the cars, and the rock to the rock heap, and the bony being handled in any way desired.

According to previous commercial practice, except by the cleaning tables disclosed in and covered by certain of my copending applications, it has been necessary to very closely size the coal by preliminary screening before attempting the automatic separation of the intermixed coal, bony and rock.

As an example of necessary previous commercial screening preparatory to separating:—All sizes above two inches were screened out; from two inches to 1 and ½ inches were screened as the next size; then from 1½ inches to 1 inch; from 1 inch to ½ inch; from ½ inch to ¼ inch; from ¼ inch to ⅛ inch; from ⅛ inch to 1/16 inch; and from 1/16 inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of the prior art and with all but one of the separating tables. I use only a single large separating table, and over this single table I send the unprepared, intermixed materials, which prior to my invention were necessarily sent first over the several screening mechanisms, and then over the corresponding separating tables, as described in the preceding paragraphs. I am able on this one table to practically completely separate the coal, rock, and bony and other impurities from three inches in dimension down to the finest dust.

My invention is applied to the separation of a continuous and forwardly flowing bed of the intermixed, divided materials, such as the unsized mixture of coal, bony and rock, the bed of materials undergoing separation being supported upon an air pervious table, through which a blast of air is driven from beneath upwardly through the bed of material, the table at the same time being moved or reciprocated to mechanically forward the separated heavier materials, which has settled down upon the table, by friction and inertia toward a place of delivery, the gradation of the force of the air current and the table structure cooperating in the novel manner hereinafter set forth to accomplish the desired result.

The invention provides broadly for feeding on the material at a locus which is at or near the rear end of the separating table, and preferably entirely across this end, at such rate as to build up at the beginning, and thereafter to continuously maintain, upon the table a bed of materials of substantially uniform thickness, which moves gradually forwardly over the table. The materials undergo progressive separation, due to the combined air and mechanical actions, as they move forwardly, gradually approaching complete separation, which is effected before the separated materials are delivered from the table.

By my present invention, the intermixed materials are fed on preferably entirely across the rear end of the air pervious table, and beginning at this time and continuing progressively forwardly along the table, the intermixed particles or fragments of material are loosened apart and separated from each other, and the lighter material gradually forms a flotant top stratum, and the heavier material gradually settles and comes to rest upon the table, and thereafter is progressed forwardly by the combined action of friction and inertia to a place of delivery.

Broadly considered, in connection with the foregoing, the process and table of my present invention, in addition to creating this superior flotant stratum of the lighter material, provides also for this stratum traveling forwardly in a straight and unconstrained path and at the end of its straight and unconstrained path, to be delivered from the table, thereby giving the shortest and most natural path to the superior flotant material.

The heavier material which comes to rest upon the table, is acted on by friction and inertia, and is propelled to the side of the table as soon as possible, and then is progressed in a continuous and unmixed stream forwardly along this one edge of the table to a place of delivery, without interfering or intermixing with the straight and uninterrupted flow of the lighter superior flotant stratum.

In connection with the foregoing, the air action is cooperatively proportioned and disposed to produce the completest and most satisfactory result in the difficult task of completely, or practically completely, separating the particles of intermixed material of such widely divergent dimensions and so closely related in relative specific gravity. Accordingly, the area or zone of greatest air activity is at or near the place of feeding on of the intermixed materials, and decreases substantially forwardly along the table, and also decreases transversely across the table in the direction of movement of the lighter stratified material, in conjunction with the forward disposition already described.

The foregoing general description and the following detail description are both explanatory and illustrative of the invention, but are not restrictive thereof.

Referring now in detail to the present preferred embodiment, the separating table is adapted to support and progress a bed of materials which is continuously maintained thereon of substantial thickness, the materials being gradually stratified and separated by a single continuous operation. As the bed of materials moves slowly forwardly along the table, the lighter and superior stratified material moves in a stream forwardly and longitudinally of the bed. The heavier and lower stratum of heavy material, immediately upon stratification and settling upon the bed, is moved laterally to the sides of the bed and is thereby substantially separated therefrom, and is then progressed forwardly by friction and inertia to discharge, and is discharged immediately from the sides of the bed almost as soon as separated. The feed of the intermixed materials to the rear end of the bed is regulated to maintain the bed continuously of the desired thickness, which usually ranges from five to nine inches of the mixture of coal, rock and other impurities as it comes from the mine.

The means for feeding on the intermixed, divided materials may be of any desired or known form, adapted to feed the materials variably or regulably, at the desired rate, to the table. As embodied, a hopper 1 is provided, having vertical side walls 4 and front and rear walls 2 and 3, which converge downwardly. At the bottom of the hopper is a regulable feeding device 5, shown as comprising a horizontally-disposed partly-cylindrical casing 6. Mounted therein is a rotatable shaft 7, upon which is fixed a plurality of discs 8. Between the discs 8 are arranged a plurality of feeding blades 9, with their ends fixed to the discs and in substantially tangential relation to the shaft 7.

The shaft 7 is rotated by any desired form of variable speed drive, and the intermixed materials are thus regulably fed out from the hopper 1 through the opening 10 onto the rear end (the right-hand end in Figs. 1 and 3) of the table. The feed of the materials is preferably substantially entirely across the rear end of the table.

The table comprises a flat, air-pervious deck 23, of suitable material, the degree of perviosity in the different parts of the table being varied to effect the practically complete separation of the materials in the bed as they pass over the table. The perviosity of the deck changes preferably forwardly along the table and also outwardly from the central part toward the side edges, as with an intermixture of rock and coal and other impurities this has been found most efficient. The table deck is preferably constructed of perforate metal plates, supported on a suitable frame.

Referring now to the general structure of the longitudinally reciprocable table, as embodied (Figs. 1, 4 and 5), the table mechanism is built upon and carried by the upper part of the air pressure chamber, the table and air chamber reciprocating longitudinally together. In said embodied construction, the air chamber has side walls 24 and 25, a front wall 22, and a rear end wall 26. Fixed to the walls of the air chamber, near the upper edges thereof, are angle frame members 27 and 28, extending entirely thereabout. Upon these frame members 27 and 28 are supported a plurality of longitudinally-disposed frame members 29, the air-pervious deck 23 of the table being supported upon the frame members 29.

Fixed to the side walls of the air chamber (Figs. 4 and 6) entirely about their bottom edges, are longitudinally-disposed angled frame members 33, 34 and 35, which, together with the side walls of the air-chamber, rest upon correspondingly shaped frame channel bars 38, 39, 40 and 41, the frame thus being of the shape and size of the air-pressure chamber. The frame has preferably inner cross-bracing members 42 and 43. The air chamber as so constructed is carried upon resilient supports, and has a flexible conduit connection to the source of air pressure supply, to permit longitudinal reciprocation of the table, as will be later more fully described.

Referring now to the embodied means for separating and stratifying the intermixed, divided materials upon the air pervious deck 23 of the table, a plurality of spaced apart separating partitions 47 are provided, fixed to and extending upwardly from the face of the table. These partitions extend from substantially the central, longitudinal axis of the table, obliquely outwardly and forwardly, terminating some distance from the side wall of the table to provide a rock channel at the extreme side edge of the table. The separating partitions are arranged preferably in pairs, with their inner ends abutting at the central longitudinal axis of the table, the members of each pair diverging forwardly and outwardly from said central point of juncture, and are preferably parallely arranged.

Figure 3:
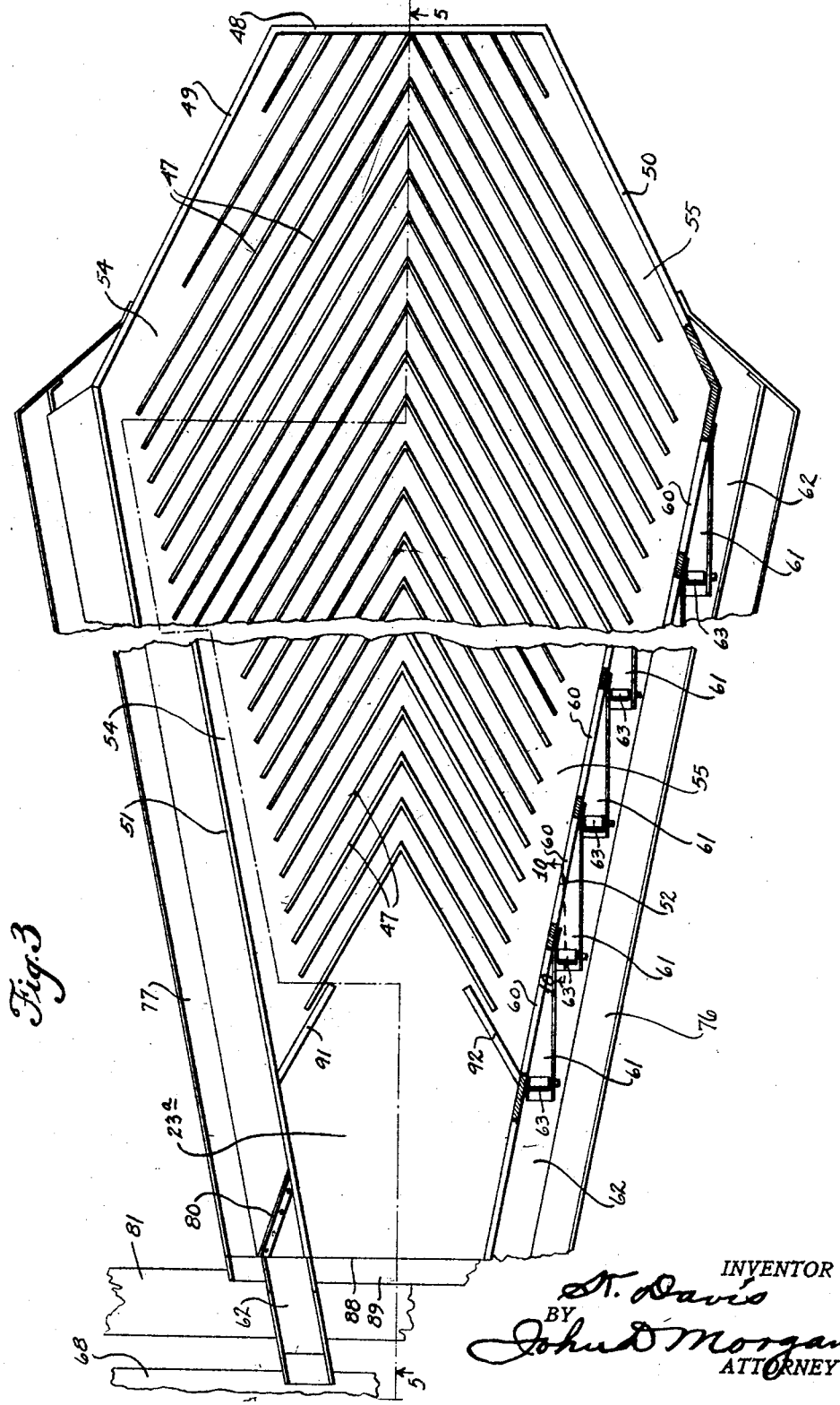
Fig. 3 is a horizontal section, taken on the line 3—3 of Fig. 1, on a larger scale, and with the central part broken away.

Across the rear end of the table is a wall 48 for the purpose of retaining the bed of materials on the table, and the separating partitions at the rear end of the table, abut at their rear ends against this rear end wall 48, the arrangement in abutting pairs already described beginning at the wall and extending forwardly therefrom along the table, as will be seen from Fig. 3. Also for the purpose of retaining the bed of materials upon the table, two side walls 49 and 50 extend upwardly from the rear portion of the side edges of the table, and at their rear ends are connected respectively to the ends of the rear wall 48. These walls 49 and 50 extend forwardly and outwardly along the edges of the table, terminating at the widest part of the table, these three walls acting to retain the bed of materials upon the rear part of the table. To retain the bed of materials upon the forward part of the table, and also to permit delivery of the forwardly traveling superior stratum of coal or other lighter material, upwardly-projecting side walls 51 and 52 connect with the forward ends of the side walls 49 and 50, and extend forwardly along the side edges of the table, and terminate at the forward end thereof. The side walls 51 and 52, however, are of less height than rear wall 48, and side walls 49 and 50, to permit the spillage or delivery of the stratified coal. As a structural convenience, the table side walls may be upward continuations of the side walls of the air pressure chamber, already described.

The arrangement of the separating partitions 47 within the table side walls has already been described. The separating partitions may optionally decrease in height very gradually from their central point of juncture outwardly toward their free ends. The exterior ends of the separating partitions, as already indicated, terminate at some distance from the side walls of the table leaving free passageways 54 and 55 along the side edges of the table as channelways for the separated rock, or other heavier material, along which said material is moved by friction and inertia to discharge. The separating partitions, forwardly along the table, terminate gradually farther and farther away from the side walls, whereby the rock channels are wider and wider forwardly along the table to accommodate the greater volume of rock or other heavier material as the separation of the intermixed materials progresses.

The intermixed divided materials, as will be understood from the foregoing description, are preferably continuously fed, in the desired volume to maintain the bed upon the table, in what may be termed a narrow belt, substantially entirely across the rear end of the separating table, very close to and substantially parallel with the rear wall 48 of the table. The separating action begins at this point, the materials becoming immediately partially stratified, the heavier or larger pieces of rock settling immediately upon the table, and the most of the lighter material and possibly the smaller pieces of the heavier material being floated or sustained at different levels above the table.

At the same time, the materials are impelled forwardly along the table with the general travel of the bed, due in part to the reciprocatory motion of the table to be later described. The rock or other heavier material, especially the larger pieces thereof, settle behind the separating partitions and due to the motion of the table are immediately impelled, by friction and inertia, to the sides of the table, and out of the body of the bed of materials, and are then impelled forwardly along the side edges of the table, practically separate and apart from the stratifying bed, to their place of discharge. A little farther along the table, in like manner, the somewhat smaller pieces of rock, or other heavier material, settle behind the separating partitions, and are immediately impelled sideways into the gutters or passageways along the side edges of the table.

The coal, or other lighter material still remains flotant above the separating partitions and is impelled directly forwardly along the table, in a direct and immediate path, to discharge at the front end of the table. This operation continues forwardly along the table as to both materials, involving gradually the smaller and smaller pieces of separated rock, all of the rock gradually settling behind the separating partitions and being impelled sidewise out of the bed and into the longitudinal rock channels and is impelled forwardly to delivery. The superior flotant stratum of coal is thus gradually and finally purified, by this single operation, and moves in a stream, as already indicated, directly forwardly along the table above the separating partitions and in a non-obstructed stream toward the front end of the table and is discharged therefrom. Due to the forward narrowing of the table, in the preferred illustrated form, the side portions of the forwardly moving stream of coal overflow the side edges of the table. This provides a greater extent of discharging edge for the superior flotant stratum of coal or other divided material, which is an advantageous feature, in that it increases the capacity of the table.

While all the separated rock, or other heavier material, flowing in separated streams along the side edges of the table, may be discharged entirely at a single place at either side, near the forward end of the table, it is found preferable to discharge the rock gradually from the side edges of the table. By this arrangement I decrease the volume of flowing rock, and also lessen the labor of conveying it to discharge. For this purpose, as embodied, a plurality of openings 60 are provided, at either forward side edge of the table, in the bottom part of the side walls 51 and 52, and just at the level of the table 23. These openings preferably increase in height forwardly, as best shown in Fig. 5, to prevent the wedging and holding of pieces of rock passing therethrough.

To convey away the separated and discharged rock, there is provided on the outside of each of the openings 60, a short forwardly-extending chute 61, these chutes emptying into a forwardly and downwardly inclined chute 62. These chutes are conveniently constructed integral with the coal conveying chutes later to be described, and are supported by brackets 78 and 79 from the respective side walls of the air pressure chamber. These chutes discharge all the rock, or other heavier material, upon a conveyor belt 68, transversely arranged at the forward end of the table. Each of the chutes 61 is preferably provided with a regulating gate 63, which may be set to control the volume of rock discharged from the gate.

The embodied form of means for receiving and delivering the stratified and separated superior layer of lighter material, such as the coal, comprises horizontally-disposed shelves 72 and 73, fixed to, and extending outwardly from, the upper edge of the side walls 51 and 52 of the table. Just beneath the outer edges of the shelves 72 and 73, respectively, are located chutes 76 and 77, supported by brackets 78 and 79, fastened to the exterior walls of the air pressure chamber. The discharged coal flows over the outer edges of the shelves 72 and 73, and drops into the chutes 76 and 77. These chutes are forwardly and downwardly inclined, and at their forward ends they discharge onto an endless conveyor belt 81, arranged transversely along the forward end of the table. Short forwardly and outwardly inclined walls 80 are provided at the forward ends of the respective shelves 72 and 73 to direct any coal reaching those points into the corresponding chutes 76 and 77.

The main body of the separated and stratified coal, or lighter material, is discharged directly over the front end of the table, and in the embodied form of means carrying out this function, the front edge 88 of the table is unobstructed, and is provided with a downwardly-extending lip 89, discharging into the transversely-disposed conveyor belt 81. The separating partitions terminate at quite a distance from the forward end of the table, as clearly shown in Fig. 3, and from this point forwardly the table itself is preferably solid, or impervious to air, as indicated at 23ª in Fig. 3.

At either side of the table, and just forwardly of the front pair of separating partitions 47, there are provided two outwardly and forwardly inclined walls 91 and 92. The upper inner edges thereof start from the level of the table, are inclined upwardly and outwardly, and at their outer ends are substantially level with the tops of the respective side walls 51 and 52. The purpose of these two walls is to direct into the foremost opening 60 for the discharge of the rock any final fragments of the rock, or other heavier material, which may be resting upon the surface of the table and be moving forwardly, and to prevent these portions of rock from being discharged with the central, forwardly-moving stream of clean coal or other lighter material.

Means are provided by the invention for longitudinally reciprocating the table, and cooperating therewith, means for varying the inclination of the table. As shown herein, and in operating most efficiently upon most kinds of intermixed materials, the table is upwardly and forwardly inclined. In the embodied form of said means, a foundation wall of concrete or other suitable material is mounted upon any suitable base, and is of the same general shape and size as the table itself. A frame 104, preferably of channel beams is provided, which is preferably of the same size and shape as the frame 38-41, which supports the air pressure chamber, and has been already described as being of substantially the shape and size of the table.

The frame 104 is mounted upon, and is variably inclinable relatively to, the supporting wall 103. For this purpose, the frame 104, at either side and toward the rear end thereof, is provided with hinged or pivotal mountings 107 and 108, supported upon the top edge of the foundation wall 103. Near the forward edge of the side reaches of the frame 104 are means for rocking the frame about its pivotal mountings 107 to vary the degree of inclination of the table. As embodied, cylindrical supports 109 are mounted upon the top edge of the foundation 103, and within the cylindrical members 109 are screw posts 110, and nuts 111 are screwed onto the posts and rest upon the top edges of the respective supports 109. The screw posts 110 have a ball and socket connection at their top ends with members 112, which are fixed to, and extend downwardly from, the lower sides of the corresponding reaches of the frame 104. Thus by turning the nuts 111 the inclination of the table will be varied. So far as concerns the broad features of the invention, the direction of inclination may be reversed, or may be in either direction.

Referring now to the embodied form of mounting of the table for longitudinal reciprocatory movement, and the means for effecting same, there are a plurality of resilient supports between the frame members 104 and the frame members 38. These comprise a plurality of pairs of angle pieces 116 and 117 fixed to, and disposed transversely of, and in spaced-apart relation along the tops of the side members of the frame 104. A plurality of pairs of corresponding similar angle pieces 118 and 119 are fixed, in like spaced-apart relation, to the undersides of the corresponding side frame members 38 and 39, which are fixed to the bottom of the air-pressure chamber. Riveted to each of these pairs of angle pieces is a vertically-disposed, flexible supporting member 115, these members supporting the air chamber and table, and flexing during the actuation of the table to provide the necessary longitudinal reciprocatory movement.

The embodied form of means for reciprocating the table comprises a rod 125, pivotally connected at 126 to the center of the rear end of the table. This rod, at its rear end 127, is pivotally connected to a crank disc 128, fixed on a shaft which is journaled in bearings 129, mounted on the top of the foundation 103. Fixed also to this shaft is a gear wheel 130, with which meshes a pinion 131, fixed on a shaft 132, which shaft is journaled in bearings 133, likewise mounted on the top of the foundation wall 103. Fixed also to the shaft 132 is a belt pulley 134, over which runs a belt 135, this belt running also over a pulley 136, fixed on the shaft of a motor 137. It will be understood that any suitable or known form of reciprocating mechanism may be used, so far as concerns most features of the invention.

The embodied form of means for supplying air pressure comprises a blowing fan 145, which blows the air into a conduit 146, which conduit extends longitudinally and centrally within the foundation 103. The top face of this longitudinally-extending conduit 146 is open substantially for the entire length of the air-pervious part of the table 23, and air-tight connection is made along the edges of the open top of the conduit by the bottom edges of a similarly shaped impervious flexible envelope 148, of canvas or other suitable material, this envelope extending upwardly therefrom. At its upper end, the top edges of the envelope 148 are connected air-tight to the lower part of the tiltable but non-reciprocating frame 104. By this connection the frame 104 may be tilted or variably inclined, with reference to the stationary conduit 146 as already described.

To permit the reciprocatory movement of the table and air pressure chamber, a similarly-shaped, flexible envelope 152 has its lower edges fastened air-tight to the upper part of the tiltable but non-reciprocating frame 104. This envelope 152 has its upper edges making air-tight connection with the lower part of the reciprocable frame 38–41, thus making an air-tight connection which will permit the reciprocation of the table and air-chamber.

Thus the table is longitudinally reciprocated and is supplied with air under pressure. The amount or intensity of the air currents through the bed of materials being separted on the table may be entirely regulated by the degree of perviosity of the table or deck 23, as already described. If desired, however, baffle plates or shutters may be provided within the air chamber, or within the conduit 146, to direct or regulate the air currents for different parts of the table in a well-known manner. An illustrative embodiment of such air control baffle plates is disclosed in my co-pending application Ser. No. 716,322, filed May 28, 1924.

Resilient means are provided, cooperating with the table-reciprocating means, already described, to prevent shock and racking during the reciprocation of the table, and devices are also provided for regulating this resilient action. As embodied, a rod 161 is fixed to the reciprocable table and air chamber frame 38–41, being screw-threaded into a bracket 162, which is bolted at 163 to the reciprocable frame, and is held in place by a pinned collar 164. The rod 161 is reciprocable in an apertured bracket 165, which is bolted at 166 to the tiltable but non-vibratable frame 104. A spring 167 is coiled about rod 161, and is in compression between the bracket 165 and a tension-regulating lock nut 168, screw-threaded on the rod 161, thereby giving a regulable spring action to the vibration of the table.

Suitable means are preferably provided for collecting the dust created by the separating action upon the table, and this means may be the same as, or generally similar to, that shown in my copending application Ser. No. 612,456 filed Jan. 13, 1923. As embodied, a casing 171 is mounted above the table, and a flexible skirt 172 is fixed to the lower edge thereof and extends downwardly about the table, the ascending air current carrying the dust up into the collecting and settling mechanism above. At the forward end of the table (Fig. 1), the dust collector terminates short of the front end of the table, and the skirt 172 thereof comes down on the bed of materials some distance from the front of the table, leaving the front end of the table accessible for inspection.

The relative degree of air current forced through the bed of materials is varied in different parts of the air pervious table, so as to secure the best and most efficient separating action, and especially to secure this result with a table of the particular structure, and having the separating partitions arranged in the manner, of my present invention. This may be accomplished by varying the degree of air perviosity in different parts of the table.

In accordance with one feature of my invention, the relative disposition of the various areas of different air perviosity, and the relation thereof to the different parts of the table, to the direction of travel of the heavier and lighter separated materials, and to the separating partitions, is represented more or less diagrammatically in Figs. 8 and 9 of the drawings. The arrangement of the various areas of different air perviosity is shown in Fig. 9, and the arrangement of the separating partitions is shown in Fig. 8.

In Fig. 9 the areas of different air perviosity are indicated respectively by the letters $a$, $b$, $c$, $d$ and $e$, the letter $a$ representing the area of greatest air perviosity and the letter $e$ representing the area of least air perviosity. While these differences in air perviosity, and consequent difference in the force of the air currents, are represented as definite areas, it will be understood that they can blend from one into the other in so far as concerns the principal features of the invention, although structurally it will be found advantageous to secure the desired effects by making the deck of the table of metal plates having perforations therein varying in size or in number for a given unit area.

From a comparison of Figs. 8 and 9, it will be seen that the degree of air perviosity of the table, and therefore of the force of the air currents therethrough, for the greater part of the table, increases outwardly and forwardly along the separating partitions, that is, with the transverse outward flow of the rock from the center of the table toward the edges, the greatest air perviosity and therefore the strongest air currents being along the outer edges of the table at the places of discharge of the rock. It will be noted further that the general disposition of the various areas of equal air perviosity is forwardly along the table, that is, in the general direction of the flow of the superior stratum of separated coal or other lighter material.

In Fig. 8 also the present preferred arrangement of separating partitions of varying height is shown. In this arrangement, any particular separating partition is preferably of uniform height throughout, but the heights of the separating partitions decrease gradually forwardly along the table. In Fig. 8 there are shown four groups of separating partitions, denoted by the letters A, B, C and D, disposed longitudinally of the table, the separating partitions A at the rear of the table being of the greatest height, the group B of somewhat lesser height, the group C being of still lesser height, and the group D of least height. It will be noted thus that the separating partitions decrease in height longitudinally of the table, that is, in the direction of travel of the coal or other lighter material being separated.

Means are provided by the mechanism just described for regulating the rate of discharge and therewith the depth of the bed or stream of heavier material flowing, or rather sliding by friction and inertia along the channels 54 and 55. For this purpose, the gates 63 are made variably positionable as shown in Fig. 10, and this may be done by any suitable means. As shown, a spring-pressed notched pivoted bar is attached to each gate 63 and projects downwardly through a small opening in the bottom of chute 61, one of the notches or teeth resting upon the top edge of the opening. Thus the depth of the bed or stream or rock or other heavier material just within the opening 60, and backwardly along the rock channel may be regulated as desired. The openings 60 may also be regulated and varied in size as a further cooperating or as an alternative regulation of the depth of the bed of rock or other heavier material. As shown a sliding gate 60$^a$ is mounted above the opening 60 and is held in regulated position by bolt and slot connection 60$^b$ with the side wall 52 of the table.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A mechanism for separating intermixed divided materials varying relatively greatly in size and relatively little in specific gravity, such as unsized coal, including in combination a relatively long and narrow air-pervious table having separating partitions disposed forwardly and transversely thereon, means for reciprocating the table longitudinally, discharge devices adjacent the forward ends of the separating partitions for delivering heavier material from the table as soon as it reaches the ends of the separating partitions, said separating partitions decreasing in height gradually and progressively from the rear toward the front end of the table, and the air-perviosity of the table also decreasing gradually, progressively and continuously from the rear toward the front of the table.

2. In a mechanism for separating intermixed divided materials, a device for controlling discharge of heavier material from an air pervious table including in combination a retaining wall along an edge of the air-pervious table, separating partitions for directing heavier material toward said wall, an opening in the wall extending upwardly from the table surface for permitting escape of heavier material directed thereto by the separating partitions, and means for controlling the amount of heavier material discharged through the opening comprising a surface in the path of the heavier material inclined upwardly from the plane of the table and means for varying the inclination of said surface with respect to the table to control the gravital opposition to the escape of said heavier material.

3. In a mechanism for separating intermixed divided materials, a device for controlling discharge of heavier material from an air-pervious table including in combination a retaining wall along an edge of the air-pervious table, separating partitions for directing heavier material toward said wall, an opening in the wall extending upwardly from the table surface for permitting escape of heavier material directed thereto by the separating partitions, and means for controlling the amount of heavier material discharged through the opening comprising a member for varying the size of the opening, a surface in the path of the heavier material inclined upwardly from the plane of the table and means for varying the inclination of said surface with respect to the table to control the gravital opposition to the escape of said heavier material.

4. A mechanism for separating intermixed divided material including in combination a longitudinally reciprocable, air-pervious table which decreases in width forwardly, means for feeding said material to the rear end thereof, material-retaining walls along the side edges of the table for maintaining thereon a bed of materials of substantial depth, separating partitions disposed forwardly and outwardly along the table for guiding settled heavier material transversely in a plurality of streams, means for discharging said streams along a side edge of the table through openings in the retaining walls, and means for discharging flotant lighter material at the front end of the table and over one of the side walls near the front end of the table, and means for maintaining the discharging lighter material above and separated from the discharging streams of heavier material.

In testimony whereof, I have signed my name to this specification.

KENNETH DAVIS.